(12) United States Patent
Fischer et al.

(10) Patent No.: US 8,160,253 B2
(45) Date of Patent: Apr. 17, 2012

(54) METHOD, TRANSPONDER, AND SYSTEM FOR RAPID DATA TRANSMISSION

(75) Inventors: Martin Fischer, Pfedelbach (DE); Ulrich Friedrich, Ellhofen (DE); Jens Masuch, Heilbronn (DE); Michael Pangels, Ludwigsburg (DE); Dirk Ziebertz, Eberstadt (DE)

(73) Assignee: Atmel Corporation, San Jose, CA (US)

( * ) Notice: Subject to any disclaimer, the term of this patent is extended or adjusted under 35 U.S.C. 154(b) by 908 days.

(21) Appl. No.: 11/819,144

(22) Filed: Jun. 25, 2007

(65) Prior Publication Data

US 2008/0008265 A1    Jan. 10, 2008

Related U.S. Application Data

(60) Provisional application No. 60/816,598, filed on Jun. 27, 2006.

(30) Foreign Application Priority Data

Jun. 23, 2006  (DE) .......................... 10 2006 030 768

(51) Int. Cl.
$H04K\ 1/00$    (2006.01)
(52) U.S. Cl. .......... 380/270; 380/255; 380/271; 380/35; 380/37; 380/42; 380/43; 380/262; 713/150; 713/160; 370/313
(58) Field of Classification Search ................ 380/35, 380/37, 42, 43, 262, 270, 271, 255; 713/160, 713/150
See application file for complete search history.

(56) References Cited

U.S. PATENT DOCUMENTS

| | | | | |
|---|---|---|---|---|
| 5,970,148 | A * | 10/1999 | Meier | 713/168 |
| 6,839,181 | B1 * | 1/2005 | Cobb et al. | 359/634 |
| 6,954,533 | B2 * | 10/2005 | Turner et al. | 713/168 |
| 7,026,935 | B2 * | 4/2006 | Diorio et al. | 340/572.2 |
| 7,193,504 | B2 * | 3/2007 | Carrender et al. | 340/10.4 |
| 7,254,232 | B2 * | 8/2007 | DiSanto et al. | 380/37 |
| 2003/0093663 | A1 * | 5/2003 | Walker | 713/150 |
| 2003/0133435 | A1 * | 7/2003 | Friedrich | 370/349 |
| 2004/0212493 | A1 * | 10/2004 | Stilp | 340/531 |
| 2005/0053024 | A1 * | 3/2005 | Friedrich | 370/313 |
| 2005/0058292 | A1 | 3/2005 | Diorio et al. | |
| 2005/0083178 | A1 | 4/2005 | Friedrich | |
| 2005/0123133 | A1 | 6/2005 | Stewart et al. | |
| 2005/0233696 | A1 * | 10/2005 | Friedrich | 455/41.2 |

(Continued)

FOREIGN PATENT DOCUMENTS

DE         10349647 A1    6/2005

(Continued)

*Primary Examiner* — Nabil El Hady
(74) *Attorney, Agent, or Firm* — Baker Botts L.L.P.

(57) ABSTRACT

A method for wireless data transmission between a base station and a transponder is provided, whereby a message, comprising at least one command and one data sequence, is transmitted by the base station, the message is received and evaluated by the transponder, at least one key is provided in the transponder after receipt of the command and before complete receipt of the message and the key is transmitted to the base station, the key is detected by the base station, and parts of the message, still to be transmitted, and/or subsequent messages are encoded by the base station with the key.

20 Claims, 1 Drawing Sheet

U.S. PATENT DOCUMENTS

| | | | |
|---|---|---|---|
| 2006/0080732 A1* | 4/2006 | Ohkubo et al. | 726/9 |
| 2007/0030125 A1 | 2/2007 | Friedrich | |
| 2007/0069851 A1* | 3/2007 | Sung et al. | 340/5.1 |
| 2007/0109124 A1* | 5/2007 | Park et al. | 340/572.1 |
| 2008/0267404 A1* | 10/2008 | Budde et al. | 380/270 |

FOREIGN PATENT DOCUMENTS

| | | |
|---|---|---|
| DE | 102004018558 A1 | 11/2005 |
| EP | 683293 A1 | 11/1995 |
| WO | WO-9015211 | 12/1990 |

\* cited by examiner

METHOD, TRANSPONDER, AND SYSTEM FOR RAPID DATA TRANSMISSION

This nonprovisional application claims priority to German Patent Application No. DE 102006030768, which was filed in Germany on Jun. 23, 2006, and to U.S. Provisional Application No. 60/816,598, which was filed on Jun. 27, 2006, and which are both herein incorporated by reference.

BACKGROUND OF THE INVENTION

1. Field of the Invention

The present invention relates to a method for wireless data transmission between a base station and a transponder, whereby a message, comprising at least one command and one data sequence, is transmitted by the base station and the message is received and evaluated by the transponder. The invention relates further to a transponder and to a system for rapid data transmission.

2. Description of the Background Art

Methods for wireless data transmission are used, for example, in contactless identification systems or so-called Radio Frequency Identification (RFID) systems. This type of system typically includes a base station or a reader or a reader unit and a plurality of transponders or remote sensors, which are located simultaneously within the response range of the base station. The transponders or their transmitting and receiving devices typically do not have an active transmitter for data transmission to the base station. Such inactive systems are called passive systems when they do not have their own power supply and semipassive systems when they have their own power supply. Passive transponders draw the power necessary for their supply from the electromagnetic field emitted by the base station.

Backscatter coupling is employed, as a rule, for data transmission from a transponder to a base station with UHF or microwaves in the far field of the base station. To that end, the base station emits electromagnetic carrier waves, which are modulated and reflected by the transmitting and receiving device of the transponder by means of a modulation method in accordance with the data to be transmitted to the base station. The typical modulation methods for this are amplitude modulation, phase modulation, and amplitude shift keying (ASK) subcarrier modulation, in which the frequency or the phase position of the subcarrier is modified.

In a data transmission between a base station and a transponder, for reasons of security and/or data protection, third parties must be prevented from being able to intercept the transmitted data. The transponder transmits the data to the base station at a low RF level. Interception is therefore possible only with increased effort. The base station, in contrast, usually transmits at a high RF level, so that interception of the transmitted data is also possible at great distances.

In order to increase data transmission security, it is generally known to encrypt the transmitted data by cryptographic methods. These cryptographic methods are usually based on random numbers, which must be exchanged between the transponder and base station. Thus, for example, the draft standard ISO/IEC_CD 18000-SC of 7 Jan. 2005 provides that write access by a base station to a transponder is preceded by a request for a random number. Based on the request, the transponder transmits a random number to the base station, which the base station uses to encrypt the data for the subsequent write access. For transmission of an access password, a block command, or for other transmissions as well, before transmission of data, random numbers for their encryption are to be exchanged.

An exchange of this kind at the front end is associated with a high time expenditure.

SUMMARY OF THE INVENTION

It is therefore an object of the present invention to provide a method, a transponder, and a system for data transmission, which enable rapid transmission of security-relevant data.

In the method of the invention for wireless data transmission between a base station and a transponder, particularly a passive or passive, backscatter-based transponder, a message, comprising at least one command and one data sequence, is transmitted by the base station and the message is received and evaluated by the transponder. At least one key is provided in the transponder after receipt of the command and before complete receipt of the message, and the key is transmitted to the base station. The key is detected by the base station and parts of the message, still to be transmitted, particularly the data sequence and/or parts of the data sequence, and/or subsequent messages are encoded by the base station with the key.

Here, a signal sequence that comprises at least one command and one data sequence is called a message. In the aforementioned draft standard, for example, messages are provided for general access, write access (write), or locked access (lock). The messages comprise at least in part additional control bits or the like, apart from the command which defines an access type and the data sequences to be transmitted to the transponder (tag). The command is typically a sequence of 8 bits. Other embodiments are conceivable, however, in which a single signal bit is used as a command. For transmission of the message, the command is transmitted first.

The data sequence of the message can be encrypted at least partially by the transmission of a key, according to the invention, after receipt of the command, without a key exchange preceding the message. The data transmitted by the base station can thereby be encrypted "on the fly," i.e., without temporary storage of the key in the base station.

In an embodiment of the invention, the transponder is a backscatter-based transponder, whereby a signal reflected by the transponder is modulated with use of phase modulation, particularly phase shift keying. This type of modulation method is simple to implement. The data transmission between base station and transponder occurs preferably in full-duplex mode, whereby the data transmission from a transponder in the direction of the base station occurs simultaneously with the data transmission from the base station to the transponder.

In another embodiment of the invention, the signal reflected by the transponder is encoded in a time domain, particularly by 3phase1 coding. Certain coding methods are established and described, for example, in the RFID/EPC standard.

In another embodiment of the invention, the signal reflected by the transponder is encoded in a frequency range, particularly by T1.5T coding, T2T coding, and F2F coding. With T1.5T coding, the time T of a primitive period is "encoded" with the factor 1.5. A logic "0" thereby becomes "T" and a logic "1" "1.5T." Other factors are conceivable instead of the aforementioned factors 1.5 and 2. The primitive period "T" can be established by a signal and/or command bit and/or a standard. Analogously, instead of the time T of the primitive period, the frequency F can be "encoded."

In another embodiment of the invention, a frequency used for coding the signal reflected by the transponder is detected by linear prediction by the base station. As a result, rapid detection of the frequency of the reflected signal is possible, and thereby rapid detection of the signal transmitted by the transponder. In an embodiment, the transmission of the signal is started after sending out of a so-called "notch," i.e., after a dip in a carrier signal. "Notches" are used in this case to synchronize the data transmission.

In another embodiment of the invention, a frequency used for coding the signal reflected by the transponder is detected by a correlator approach by the base station. This also makes possible rapid detection of the frequency of the reflected signal.

In another embodiment, a random number or random number sequence is generated as the key and provided to the transponder. Random numbers make possible a simple cryptographic method which is easy to implement.

In an aspect of the invention, the random number is generated with use of a random number generator, particularly a linear feedback shift register. A method of this kind enables simple generation of random numbers.

In another embodiment, the random number or random number sequence is generated with use of an analog noise generator. A Schmitt trigger, for example, can be connected downstream to the analog noise generator, so that a chaotic digital current is produced. Very noisy amplifiers or chaotic oscillators can be used as the basic circuit for analog circuits.

In another embodiment, a key sequence is generated by a keystream generator and/or as a result of an authentication process.

The object is achieved furthermore by a transponder, particularly a passive or passive, backscatter-based transponder, for wireless data transmission from and to a base station, whereby a message, comprising at least one command and one data sequence and transmitted by the base station, can be received and evaluated by the transponder, after receipt of the command and before complete receipt of the message at least one key can be provided by the transponder and transmitted to the base station, and then received parts of the message are decodable by the transponder with the key. Suitable means by which the key can be provided and/or transmitted are provided in the transponder. The transmission occurs preferably by backscattering the received signal, whereby the signal for backscattering is encoded by a suitable means of the transponder within the time domain.

The object is achieved in addition by a system for wireless data transmission, comprising at least one transponder, particularly a passive or passive, backscatter-based transponder, and at least one base station, whereby a message, comprising at least one command and one data sequence, can be transmitted from the base station to the transponder and can be received and evaluated by the transponder, after receipt of the command and before complete receipt of the message at least one key can be provided by the transponder and transmitted to a base station, the transmitted key can be detected by the base station, and parts of the message, still to be transmitted, can be encoded with the key, and parts of the message, received encoded, are decodable by the transponder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
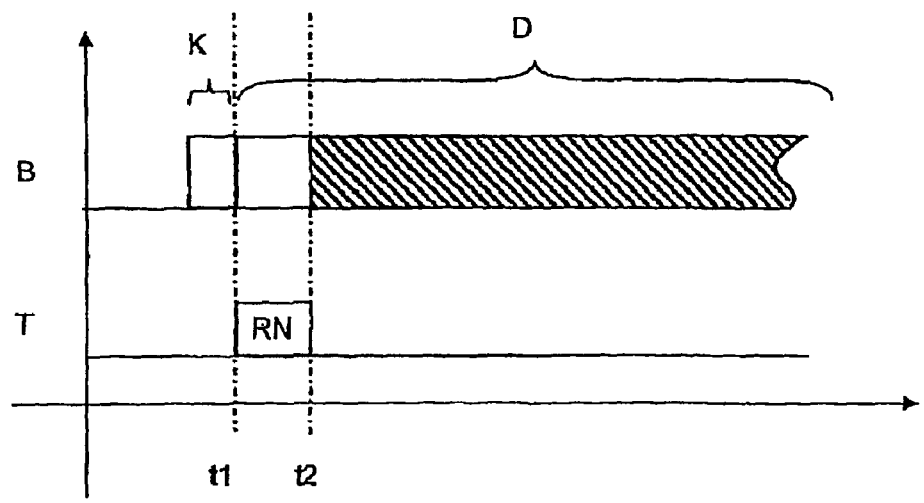
FIG. 1 illustrates s a method of the invention for rapid and secure data transmission.

FIG. 1 schematically shows a sequence of the method of the invention for rapid and secure transmission of data. In the method, a message, comprising a command K and a data sequence D, is transmitted by a base station B. The message is received and evaluated by a transponder T. According to the invention, the key is provided by the transponder T after receipt of the command K at time t1 and before receipt of the data sequence D. In the shown embodiment, the key is a random number RN. The random number RN is transmitted to the base station B. The transmission occurs by backscattering the received signal. The transponder T and base station B are thereby operated at least temporarily in full-duplex mode. The base station B at time t2 detects the random number RN and encrypts the parts of the data sequence D, still to be transmitted, with the random number RN. The encryption occurs, for example, by an XOR operation.

Figure 2:
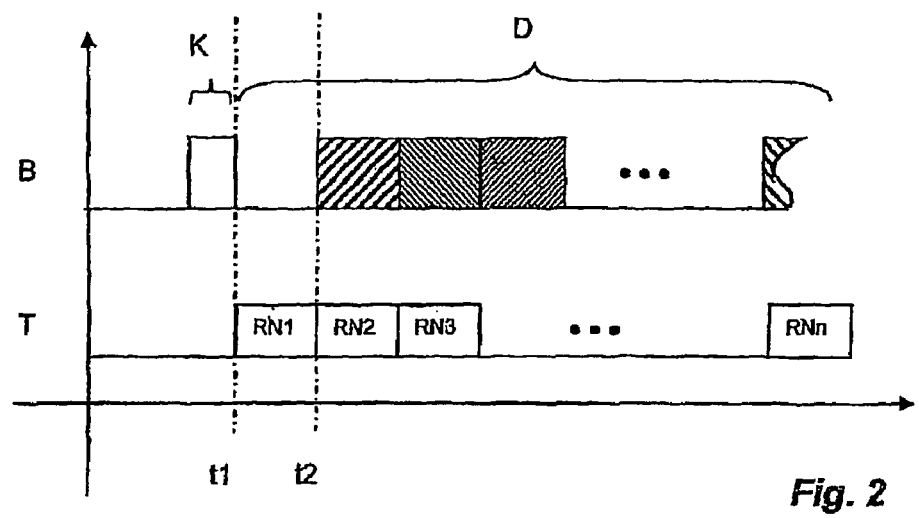
FIG. 2 is a second exemplary embodiment of a method of the invention for rapid and secure data transmission.

FIG. 2 schematically shows a sequence of a modified method of the invention for rapid and secure transmission of data. In the method, a message comprising a command K and a data sequence D is also transmitted by the base station B. The message is received and evaluated by a transponder T. According to the second exemplary embodiment, a key sequence is provided by the transponder T after receipt of the command K at time t1 and before receipt of the data sequence D. In the shown embodiment, the key sequence is a random number sequence RN1 . . . RNn. The random number sequence RN1 . . . RNn is transmitted to the base station B. The transmission from the transponder T to the base station occurs by backscattering the received signal. The transponder T and base station B are thereby operated at least temporarily in full-duplex mode. The base station B at time t2 detects the random number sequence RN1 . . . RNn and encrypts the parts of the data sequence D, still to be transmitted, with the random number sequence RN1 . . . RNn. The encryption occurs preferably also by a logic operation, particularly an XOR operation.

Figure 3:
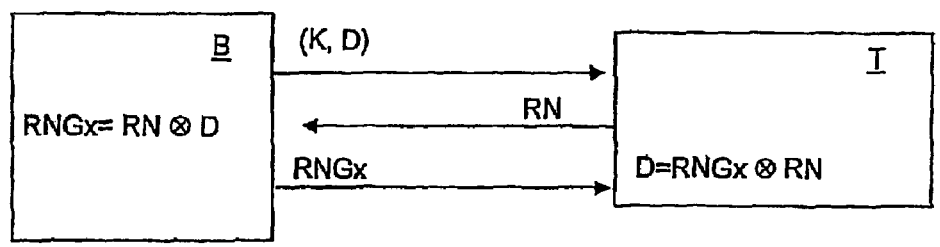
FIG. 3 is a schematic illustration of a system for rapid and secure data transmission.

FIG. 3 shows schematically a system for wireless data transmission comprising a base station B and a transponder T. The base station B transmits a message to the transponder T. The message comprises, for example, as shown in FIGS. 1 and 2, a command K and a data sequence D. The message can be received and evaluated by suitable means (not shown) in the transponder. After receipt of the command and before complete receipt of the message, a random number RN can be generated by suitable means (also not shown) in the transponder T and transmitted to the base station B. The base station B detects the random number RN. As a result, the parts of the message, still to be transmitted, can be encoded with the random number RN. The encoded parts of the message RNGx are transmitted to the transponder T and can be decoded by the transponder T. In another embodiment, instead of the random number RN, a random number sequence is generated and transmitted.

The transponder T is assigned to a product (not shown), such as, for example, a motor vehicle. In this case, information about the motor vehicle, which is to be readable by other, authorized base stations at a specific time and/or at a specific location, can be stored in the transponder in a nonvolatile memory region. These include, for example, engine data, data for certain control devices, and others. These data are not to be available to unauthorized third parties at least in part for reasons of data protection and/or security. In addition, in certain applications and/or RFID systems, it can be provided that a read and/or write access precedes transmission of a (symmetric) password. To prevent an unauthorized third party from intercepting security-relevant data and/or the password during transfer and/or transmission to the transponder, the data are encrypted during transmission from the base station to the transponder.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
   receiving, by a transponder, at least one portion of a message transmitted by a base station; and
   after complete receipt of a command in the message and before complete receipt of a data sequence in the message:
   transmitting at least one key to the base station; and
   in response to the base station receiving and detecting the at least one key, receiving from the base station one or more subsequent portions of the data sequence in the message in an encoded form, the encoding of the one or more subsequent portions of the data sequence in the message being performed by the base station according to the at least one key, the base station not having encoded according to the at least one key one or more prior portions of the data sequence in the message received by the transponder.

2. The method of claim 1, wherein a signal reflected by the transponder is modulated with phase modulation or phase-shift keying.

3. The method of claim 2, wherein the signal reflected by the transponder is encoded in a time domain by 3-phase-1 coding.

4. The method of claim 2, wherein the signal reflected by the transponder is encoded in a frequency range by T1.5T coding, T2T coding, or F2F coding.

5. The method of claim 4, wherein a frequency used for coding the signal reflected by the transponder is detected by linear prediction by the base station.

6. The method of claim 4, wherein a frequency used for coding the signal reflected by the transponder is detected by a correlator approach by the base station.

7. The method of claim 1, wherein the at least one key comprises a randomly generated number or number sequence, one or more of the subsequent portions of the data sequence are encoded by the base station using one or more corresponding portions of the randomly generated number or number sequence.

8. The method of claim 7, wherein the randomly generated number or number sequence is generated with use of a linear feedback shift register.

9. The method of claim 7, wherein the randomly generated number or number sequence is generated with use of an analog noise generator.

10. The method of claim 1, wherein the at least on key comprises a key sequence generated by a keystream generator or from an authentication process.

11. The method of claim 1, further comprising decoding the one or more subsequent portions of the data sequence in the message according to the at least one key.

12. The method of claim 1, wherein the command and the one or more prior portions of the data sequence in the message are unencoded.

13. A transponder configured to:
    receive at least one portion of a message transmitted by a base station; and
    after complete receipt of a command and before complete receipt of a data sequence in the message:
    transmit at least one key to the base station; and
    in response to the base station receiving and detecting the at least one key, receive from the base station one or more subsequent portions of the data sequence in the message in an encoded form, the encoding of the one or more subsequent portions of the data sequence in the message being performed by the base station according to the at least one key, the base station not having encoded according to the at least one key one or more prior portions of the data sequence in the message received by the transponder.

14. The transponder of claim 13, wherein the at least one key comprises a randomly generated number or number sequence, one or more of the subsequent portions of the data sequence are encoded by the base station using one or more corresponding portions of the randomly generated number or number sequence.

15. The transponder of claim 14, wherein the randomly generated number or number sequence is generated with use of a linear feedback shift register.

16. The transponder of claim 14, wherein the randomly generated number or number sequence is generated with use of an analog noise generator.

17. The transponder of claim 13, wherein the at least on key comprises a key sequence generated by a keystream generator or from an authentication process.

18. The transponder of claim 13, further configured to decode the one or more subsequent portions of the data sequence in the message according to the at least one key.

19. The transponder of claim 13, wherein the command and the one or more prior portions of the data sequence in the message are unencoded.

20. A base station configured to:
    transmit at least one portion of a message to a transponder; and
    after complete receipt by the transponder of a command in the message and before complete receipt by the transponder of a data sequence in the message:
    receive at least one key from the transponder; and
    transmit to the transponder one or more subsequent portions of the data sequence in the message in an encoded form, the encoding of the one or more subsequent portions of the data sequence in the message being performed by the base station according to the at least one key, the base station not having encoded according to the at least one key one or more prior portions of the data sequence in the message received by the transponder.

* * * * *